United States Patent
Sahu

[11] Patent Number: 6,086,115
[45] Date of Patent: Jul. 11, 2000

[54] COUPLING WITH FERRULE FOR CRIMPING AND SWAGING

[75] Inventor: Devendra Kishore Sahu, Knoxville, Tenn.

[73] Assignee: Morris Coupling Co., Erie, Pa.

[21] Appl. No.: 09/118,432

[22] Filed: Jul. 17, 1998

[51] Int. Cl.[7] .................................................. E21B 19/10
[52] U.S. Cl. ...................... 285/148.19; 285/256; 285/360
[58] Field of Search .................................... 285/256, 259, 285/360, 376, 148.19

[56] References Cited

U.S. PATENT DOCUMENTS

| | | | |
|---|---|---|---|
| 692,795 | 2/1902 | Moyle | 285/361 X |
| 2,166,524 | 7/1939 | Goodall | 285/78 |
| 2,512,741 | 6/1950 | Goodall | 285/78 |
| 3,029,093 | 4/1962 | Willis | 285/376 X |
| 3,160,428 | 12/1964 | Goodall | 285/256 |
| 4,438,884 | 3/1984 | O'Brien et al. | 285/376 |
| 4,593,942 | 6/1986 | Loker | 285/253 |
| 4,603,888 | 8/1986 | Goodall et al. | 285/55 |
| 4,758,029 | 7/1988 | Davis | 285/253 |
| 5,137,308 | 8/1992 | Beagle | 285/256 |
| 5,255,944 | 10/1993 | Blin et al. | 285/149 |

FOREIGN PATENT DOCUMENTS 22229508 9/1990 United Kingdom ................... 285/256

*Primary Examiner*—Dave W. Arola
*Attorney, Agent, or Firm*—Lovercheck and Lovercheck

[57] ABSTRACT

A coupling for connecting a hose to a container. The coupling is made up of a tubular body that telescopically receives a ferrule. The coupling has a stop flange with diametrically spaced recesses and the ferrule has diametrically spaced inwardly extending projections that pass through the recesses in the stop flange when the ferrule is inserted onto the coupling. The ferrule is then rotated so that the projections overlay the stop flange and prevent the ferrule from being removed during shipment or storage of the couplings. The ferrule can be swaged or crimped to the hose for holding the hose to the coupling in the conventional manner.

7 Claims, 2 Drawing Sheets

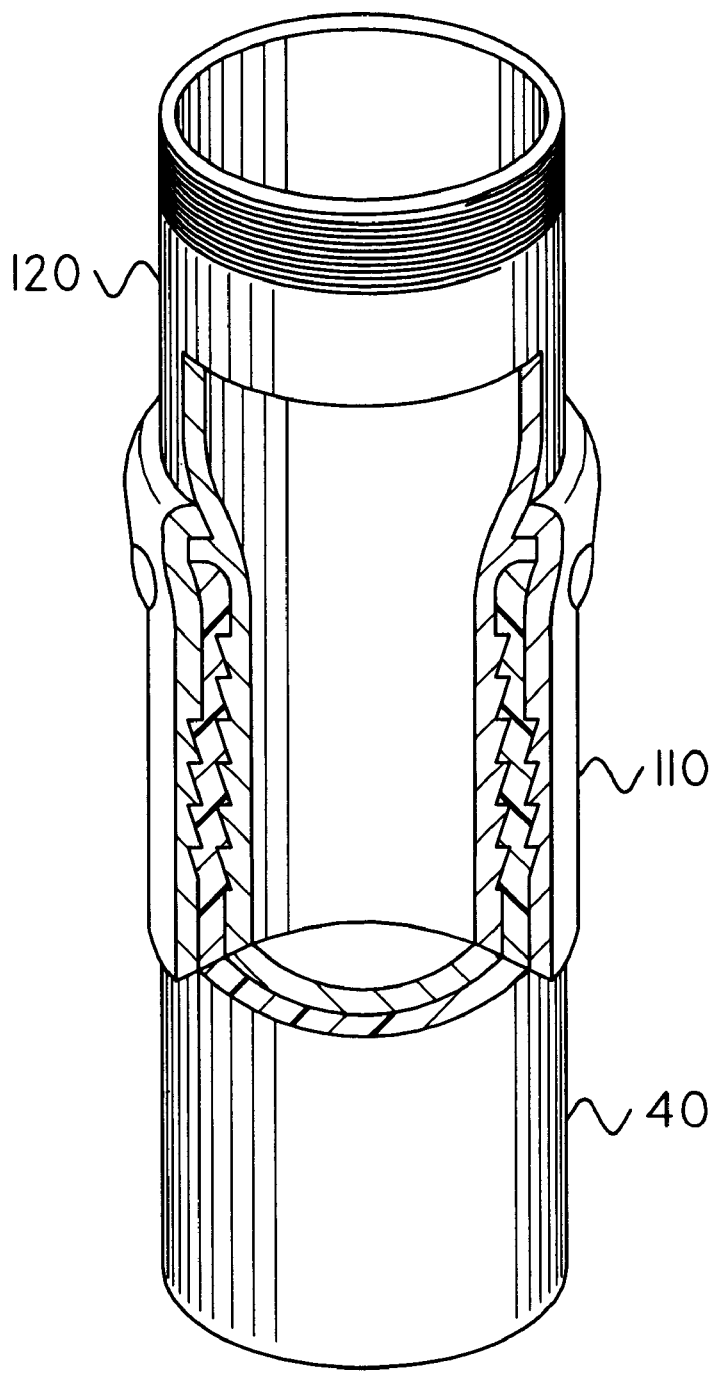
Fig_5
(Prior Art)

COUPLING WITH FERRULE FOR CRIMPING AND SWAGING

This application claims the benefit of U.S. Provisional Application Ser. No. 60/052,868, filed Jul. 17, 1997.

BACKGROUND OF THE INVENTION

The present invention relates to a ferrule for connecting a hose to a coupler. At present, swaging ferrules have to be formed and inserted on the coupler or adapter fitting and shipped for swaging in assembled position. Ferrules are inserted and formed between the hose shank collar and adapter and can not be removed unless the ferrule is cut and destroyed. This requires keeping an inventory of coupler and ferrule subassemblies for various sizes and diameters of hose and fittings.

Applicant has provided a new swaging ferrule and a cam and a groove hose shank fitting that allows shipping ferrules and coupler-adaptors separate and not preassembled. This design is achieved by making ferrule ends formed with teeth-notches and coupler-adaptor collar with the attaching notches. This allows the ferrule to be placed on the coupler-adaptor collar just before swaging.

Applicant is aware of the following U.S. Patents: U.S. Pat. Nos. 2,166,524; 2,512,741; 3,160,428; 4,593,942; 4,603,888; 4,758,029; 5,137,308; and, 5,255,944.

SUMMARY OF THE INVENTION

An object of the present invention is to provide a coupler and a ferrule that can be attached to the coupler at the final destination after the type of coupler has been determined.

Another object of the present invention is to provide a coupling with ferrule for crimping and swaging that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

FIG. 5 is a coupling with a hose supported on it and a ferrule swaged in place according to the prior art.

DESCRIPTION OF THE PREFERRED EMBODIMENT(S)

Figure 1:
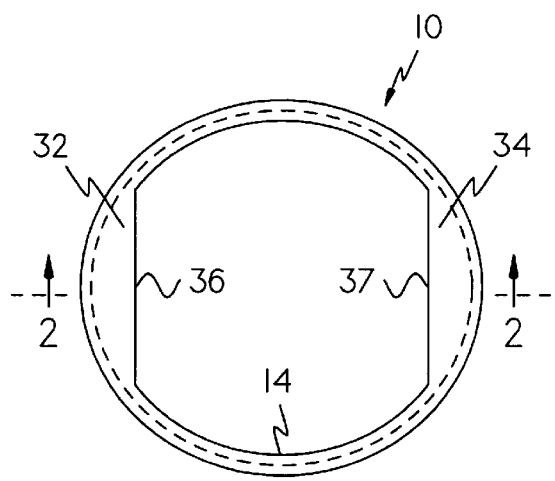
FIG. 1 is a top view of the ferrule according to the invention.
Figure 3:
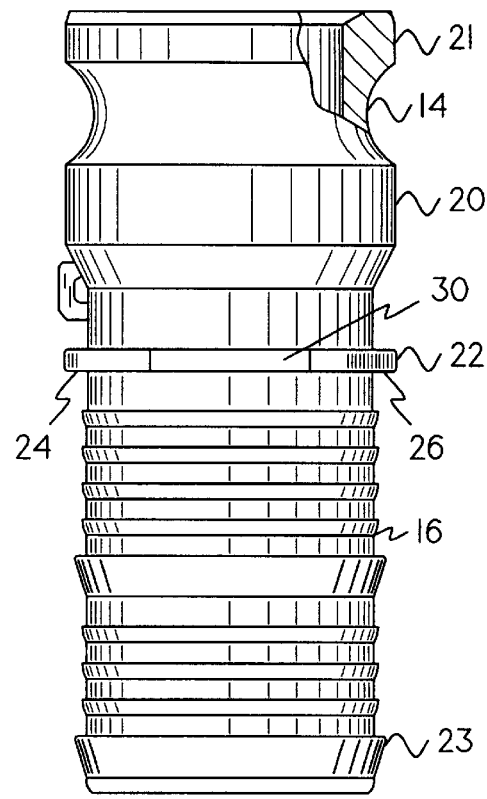
FIG. 3 is a side view of the coupling.
Figure 2:
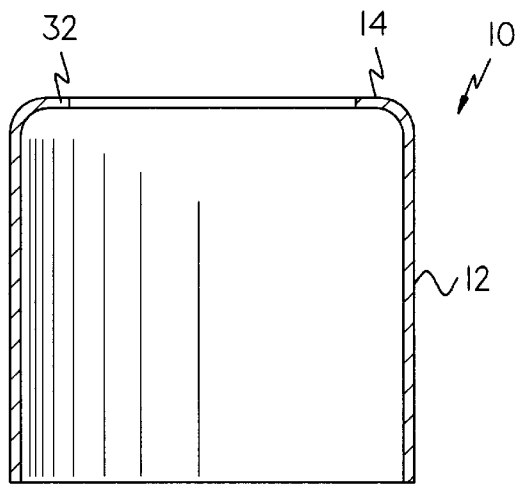
FIG. 2 is a cross sectional view of the ferrule taken on line 2—2 of FIG. 1.
Figure 4:
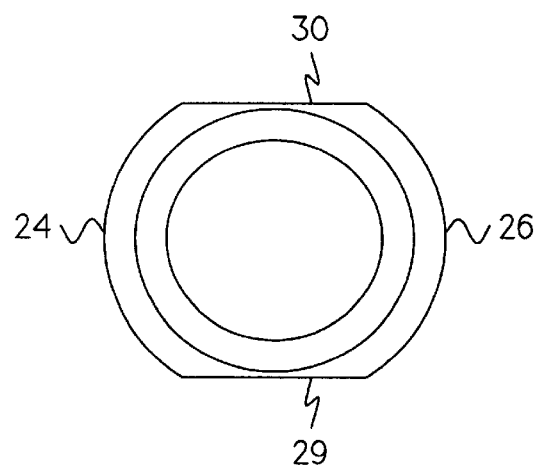
FIG. 4 is a bottom view of the coupling.

Now with more particular reference to the drawings, applicant shows ferrule 10 and coupling 20 for connecting hose 40 to a container, such as a fuel tank.

Coupling 20 has body 16 generally in the form of a hollow cylinder having first end 21 and second end 23. Stop flange 22, having sections 24,26, is integrally attached to coupling 20 adjacent first end 21. Recesses 29,30 are formed in stop flange 22 by surfaces that are generally parallel to each other.

Ferrule 10 has hollow cylindrical body 12 having inwardly extending flange 14. Flange 14 has an inside diameter greater than the outside diameter of stop flange 22 so that when coupling 20 is telescopically inserted in ferrule 10, stop flange 22 can pass through flange 14. Edges 36,37 are generally parallel to each other.

Inwardly extending projections 32,34 are integrally attached to inwardly extending flange 14 and extend toward each other with parallel edge surfaces 36,37 spaced from each other a distance at least as great as the distance between the surfaces forming recesses 29,30 on stop flange sections 24,26 so that projections 32,34 can overlie stop flange 22. The edges forming recesses 29,30 are generally parallel to each other.

Coupler 20 and ferrule 10 is shipped loose for the hose assembly. Since coupler body and ferrule are separate, coupler body can be used for assembly by means of band clamp, crimping, and swaging or any other means for attaching the hose.

When the coupler is to be assembled using crimping or swaging method, coupler body 16 is inserted into ferrule 10. Ferrule 10 is telescopically received on coupler body 16 and rotated relative to coupler body 16 so that projections 32,34 pass through recesses 29,30. Ferrule 10 is then rotated to bring projections 32,34 into alignment with stop flange section 24,26 so that ferrule 10 will be retained on coupler body 16 and can not be pulled out without rotating ferrule 16 back to the earlier position. Hose is then inserted in the space between ferrule body 12 and coupler body 16. Body 12 can then be swaged or crimped to hold the hose rigidly to coupler body 16 in a conventional manner.

The embodiment of FIG. 5 shows a conventional coupling 120 with a conventional ferrule 110 swaged to hose 40 holding hose 40 to coupling 20.

FIG. 6 shows a conventional coupling with ferrule permanently attached before swaging to the hose.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A coupling for connecting a hose to a container comprising;

a tubular coupling having a first end and a second end;

connecting means on said first end for connecting to said hose and a coupling means on said second end for connecting said coupling to said container;

said coupling means comprises a stop flange disposed on said coupling adjacent said first end;

said stop flange extending radially outwardly from said coupling;

a recess in said stop flange;

a hollow generally cylindrical ferrule body having a projection extending inwardly;

said coupling being adapted to be inserted into said hollow ferrule whereby said projection passes through said recess in said stop flange;

said hollow ferrule being adapted to be rotated bringing said projection to overlay said stop flange for retaining said ferrule on said coupling.

2. The coupling recited in claim 1 wherein at least two said recesses are formed in said stop flange;

and at least two said projections are formed on said ferrule spaced from one another;

said projections being adapted to pass through said recesses when said coupling is telescoped into said ferrule.

3. The coupling recited in claim 2 wherein said projections on said ferrule are formed by edges that are generally tangent to said ferrule.

4. The coupling recited in claim 2 wherein said coupling is cylindrical and has a diameter;

said recesses are each defined by surfaces that are parallel to said diameter.

5. The coupling recited in claim 4 wherein said projections are defined by surfaces that are parallel to each other.

6. The coupling recited in claim 5 wherein said projections are defined by surfaces that are parallel to the diameter of said ferrule.

7. The coupling recited in claim 1 wherein said recesses in said stop flange are defined by edges generally tangent to said coupling.

* * * * *